United States Patent
Pellenc et al.

(10) Patent No.: US 6,283,853 B1
(45) Date of Patent: Sep. 4, 2001

(54) ON-BOARD DEVICE AND METHOD FOR CONTINUOUS WEIGHING OF HARVEST AND HARVESTING MACHINES USING SAME

(75) Inventors: Roger Pellenc, Pertuis; Antoine Bourely, La Tour d'Aigues, both of (FR)

(73) Assignee: Pellenc S.A., Pertuis (FR)

( * ) Notice: Subject to any disclaimer, the term of this patent is extended or adjusted under 35 U.S.C. 154(b) by 0 days.

(21) Appl. No.: 09/297,057
(22) PCT Filed: Sep. 4, 1998
(86) PCT No.: PCT/FR98/01900
  § 371 Date: Apr. 29, 1999
  § 102(e) Date: Apr. 29, 1999
(87) PCT Pub. No.: WO99/13301
  PCT Pub. Date: Mar. 18, 1999

(30) Foreign Application Priority Data

Sep. 5, 1997 (FR) .................................................. 97 11265

(51) Int. Cl.[7] .............................. A01D 75/18; A01F 12/16
(52) U.S. Cl. ................................................ 460/6; 460/114
(58) Field of Search ................................ 460/6, 114, 119, 460/149, 4, 7, 116, 150; 56/10.2 R, 102 H, DIG. 15

(56) References Cited

U.S. PATENT DOCUMENTS

| | | | |
|---|---|---|---|
| 5,050,693 | 9/1991 | Wirth et al. | 177/200 |
| 5,318,475 | * 6/1994 | Schrock et al. | 460/1 |
| 5,487,702 | * 1/1996 | Campbell et al. | 460/7 |
| 5,685,772 | * 11/1997 | Andersen et al. | 460/6 |
| 5,750,877 | * 5/1998 | Behnke et al. | 73/1.33 |
| 5,863,247 | * 1/1999 | Behnke et al. | 460/6 |
| 5,890,961 | * 4/1999 | Behnke et al. | 460/6 |

FOREIGN PATENT DOCUMENTS

| | | |
|---|---|---|
| 4239201 | 5/1994 | (DE) . |
| 195 44 057 | 5/1997 | (DE) . |
| 0656530 | 6/1995 | (EP) . |
| 2601771 | 1/1988 | (FR) . |
| 2709230 | 3/1995 | (FR) . |
| 89/03023 | 4/1989 | (WO) . |

* cited by examiner

Primary Examiner—Thomas B. Will
Assistant Examiner—Árpád Fábián Kovács
(74) Attorney, Agent, or Firm—Greenblum & Bernstein, P.L.C.

(57) ABSTRACT

Device and method of on-board weighing of harvested materials on a harvesting machine having a path for the harvested material. The device includes first and second weighing devices disposed near each other on a common support and being connected to an electronic computer. The first and second weighing devices are one of an electronic balance or scale. The second weighing device is equipped with a weighing platform which is installed in the path of the harvested material. A feed system is included which is independent of the weighing platform The method includes supporting a known fixed mass on the first weighing device, successively weighing the known fixed mass on the first weighing device, feeding, with the feeding system, the harvested material continuously and in successive lots onto the weighing platform of the second weighing device, weighing the harvested material on the second weighing device, and processing signals from the first and second weighing devices using the computer. The computer performs algorithmic processing of the signals to eliminate a dynamic interference effect which results from one of slopes, tilts and vibrations of the harvesting machine.

22 Claims, 5 Drawing Sheets

ON-BOARD DEVICE AND METHOD FOR CONTINUOUS WEIGHING OF HARVEST AND HARVESTING MACHINES USING SAME

BACKGROUND OF THE INVENTION

1. Field of the Invention

The present invention concerns a continuous, on-board harvest weighing device and process for various agricultural products which may be in the form of grains (cereals and others), or seeds (coffee, beans, etc.), or berries (grapes, raspberries, gooseberries, currants, etc.), or others (olives, walnuts, almonds, tomatoes, etc.).

2. Description of Background and Relevant Information

It also concerns harvesting machines for various agricultural products making use of this device and this process.

In general, continuous, on-board weighing on harvest machines is intended to offer growers the possibility of determining, in real time, the per-hectare yield of their cultivated land parcels and to establish parcel maps for use in the selection of crops and/or in land conditioning.

The device and process according to the invention are very advantageously applicable for continuous, on-board harvest weighing of berries such as grapes, raspberries, gooseberries, currants, etc., such that this application is described more specifically in the following as an absolutely nonrestrictive example.

For example, in the area of viticulture, it is known that the production of quality wines (wines with a guarantee of origin) requires winegrowers, at the time of harvest, not to exceed the per-hectare yields established by regulations based on the quality certifications.

On the other hand, it is known that worldwide viticulture and especially French viticulture are more and more oriented toward quality production.

To meet this objective, it is necessary to proceed with selective grape harvesting according to which only grapes with the required qualities of maturity are harvested. Currently, such selective harvests are performed manually. However, the applicant has perfected a machine and a process for selective harvesting of grapes, using a known shaking system, comprising two superimposed grape picking units, and coupled with at least one electrohydraulic drive device including at least one hydraulic cylinder controlled by a servovalve driven by a electronic control unit with a microprocessor.

However, even if one masters the laws of movements of the shakers or picking arms, it is indispensable, to arrive at a selective harvest with the best yield authorized by the regulations applicable to the quality zone in question, to determine, in real time, the weight of grapes harvested.

The continuous weighing tests performed with known devices and processes have enabled verification of the fact that it is not possible to extrapolate the continuous per-hectare yield measurement system from combines, because the products in question are completely different (since the grape harvest is partially liquid). On the other hand, another major difficulty for continuous harvest weighing on a grape harvesting machine, during operation, results from the magnitude of the interference with weighing due to the vibration of the harvesting head and the tilting of the machine on hills, slopes, and banking when it operates on irregular terrain.

The object of the invention is thus a process and a device for continuous, on-board weighing in real time of the harvested material enabling overcoming the aforementioned causes likely to distort the weighing and obtaining the best possible precision.

A machine and a process are known (WO89/03023A) for weighing using two electronic balances placed on the same support and connected to an electronic computer, with one of these balances being a control balance supporting a fixed known reference mass, whereas the second balance supports a weighing platform, with electronic computer being programmed to process signals originating from the two balances, in order to eliminate the effect of the dynamic interference to which these balances may be subjected. The process and the machine described in the aforementioned document do not enable performance of the very specific weighing which is continuous weighing on a harvest machine such as a grape harvesting machine.

A weighing machine (EP 0 656 530 A) is also known which includes a weighing platform consisting of a belt-type conveyor of which the carrying structure rests on a plurality of weighing cells disposed on the floor, with this machine also including vibration detection cells disposed on the floor to detect vibrations thereof and to issue detection signals, and a signal processing unit enabling processing of signals from the weighing cells and the vibration detection cells, to correct the effects of the vibrations of the floor on the weight signals. This machine does not use a pair of balances constituting one balance with a weighing platform and a control balance with a known fixed reference mass. Nor does it use means to provide for the continuous passage of a harvested material over the weighing platform of a second balance positioned stationarily in the path of the harvested material or an electronic computer programmed to perform, during weighing, algorithmic processing of the signals from the two balances, to eliminate the effect of the dynamic interference to which these balances are subjected.

Neither the machine disclosed in the document WO 89/03023 nor that described in the document EP-0,656,530A is usable to perform weighing, continuously or in successive lots, on harvesting machines, of very specific semisolid, semiliquid harvested products, such as grape harvesting.

SUMMARY OF THE INVENTION

According to the process of the invention:

- two electronic balances or scales, preferably identical, are disposed on the same support as near as possible to each other, with these balances or scales being, for example, of the strain gauge or capacitive type;
- the two balances or scales are connected to an electronic computer;
- one of the balances or scales supports a known fixed mass and performs successive weighings of this mass;
- the other balance equipped with a weighing platform placed in the path of the harvested material simultaneously weighs this harvested material;
- the process is noteworthy in that the harvested material is conveyed automatically, continuously and/or in successive lots, onto the weighing platform of the second balance, by utilizing a feed system independent of the weighing platform, and in that the electronic computer performs algorithmic processing of the signals from the two balances to eliminate the effect of all the dynamic interference to which they are subjected while the machine is in operation.

The device according to the invention includes two electronic balances, preferably identical, for example, of a strain gauge or a capacitive type, placed on the same support and connected to an electronic computer, with one of these balances being a control balance supporting a fixed known reference mass, whereas the second balance supports a weighing platform placed in the path of the harvested material, with this device being noteworthy in that it includes an automatic feed system for the harvested material, independent of the weighing platform and moving above the later, with this feed system providing for the passage, continuously or in successive lots, of the harvested material over the weighing platform of the weighing balance, with the electronic computer being programmed to perform, during weighing, algorithmic processing of the signals from the two balances, to eliminate the effect of all the dynamic interference (slopes, inclines, vibrations) to which the two balances are subjected while the harvest machine is in action.

In the application to grape harvesting machines, the process and the device according to the invention enable continuous real-time weighing of the grape harvest, with an error less than 3%.

According to another characteristic of the process according to the invention, the processing algorithm for the signals P and $P_o$ from the two balances may advantageously be the following:

$$P = M.[(\vec{g} + \vec{\gamma}).\vec{Z}] \quad (1)$$

$$P_o = M_o.[(\vec{g} + \vec{\gamma}).\vec{Z}] \quad (2)$$

From which we derive:

$$M = M_o.P/P_o \quad (3)$$

At all times, the force measured on a balance is indicated by the formula $$P = M.[(\vec{g} + \vec{\gamma}).\vec{Z}] \quad (1)$$

In this formula,

P is the force measured,

M is the mass to be measured, $\vec{g}$ is the gravity acceleration, directed downward, $\vec{\gamma}$ is the acceleration representing the dynamic interference, randomly directed.

$\vec{Z}$ is the unit vector perpendicular to the weighing platforms, and is oriented according to the tilt of the machine.

The problem is that the terms γ and Z are unknown.

However, the force measured by the balance supporting the fixed mass is reported at the same instant by the formula (2).

$$P_o = M_o.[(\vec{g} + \vec{\gamma}).\vec{Z}] \quad (2)$$

In this formula:

$P_o$ is the force measured by the control balance supporting the fixed mass;

$M_o$ is the value of the fixed mass.

The term in square brackets in the two formulas is a number, i.e., the scalar product of the vectors considered. It is identical in the two formulas; consequently it is possible to divide one formula by the other.

Formula (3), in which the unknown vectors have been eliminated, is thus obtained.

$$M = M_o.P/P_o \quad (3)$$

According to another characteristic, the feed system of the harvested material providing for its passage over the weighing platform of the weighing balance includes a conveyor belt and the weighing device has a mechanism enabling measurement of the rate of travel of this conveyor belt, with this measurement mechanism linked to the electronic computer.

Thus, the weight data provided by each weighing combined with the travel rate data of the conveyor belt enable calculation of the weight rate harvested.

According to another characteristic, the electronic computer unit of the weighing system is linked with wheel sensors or other devices on the harvesting machine to measure its forward speed.

Thanks to this provision, the continuously measured weight rate enables determination not only of the total weight of the grape harvest from the beginning of the parcel harvested but also the per-hectare yield since the beginning of the parcel, as well as the weight of grapes per linear meter and even the weight of grapes per vine.

BRIEF DESCRIPTION OF THE DRAWINGS

The above objects, characteristics, and advantages and others as well will be better understood from the description which follows and from the annexed drawings, in which.

DETAILED DESCRIPTION OF THE INVENTION

Figure 1:
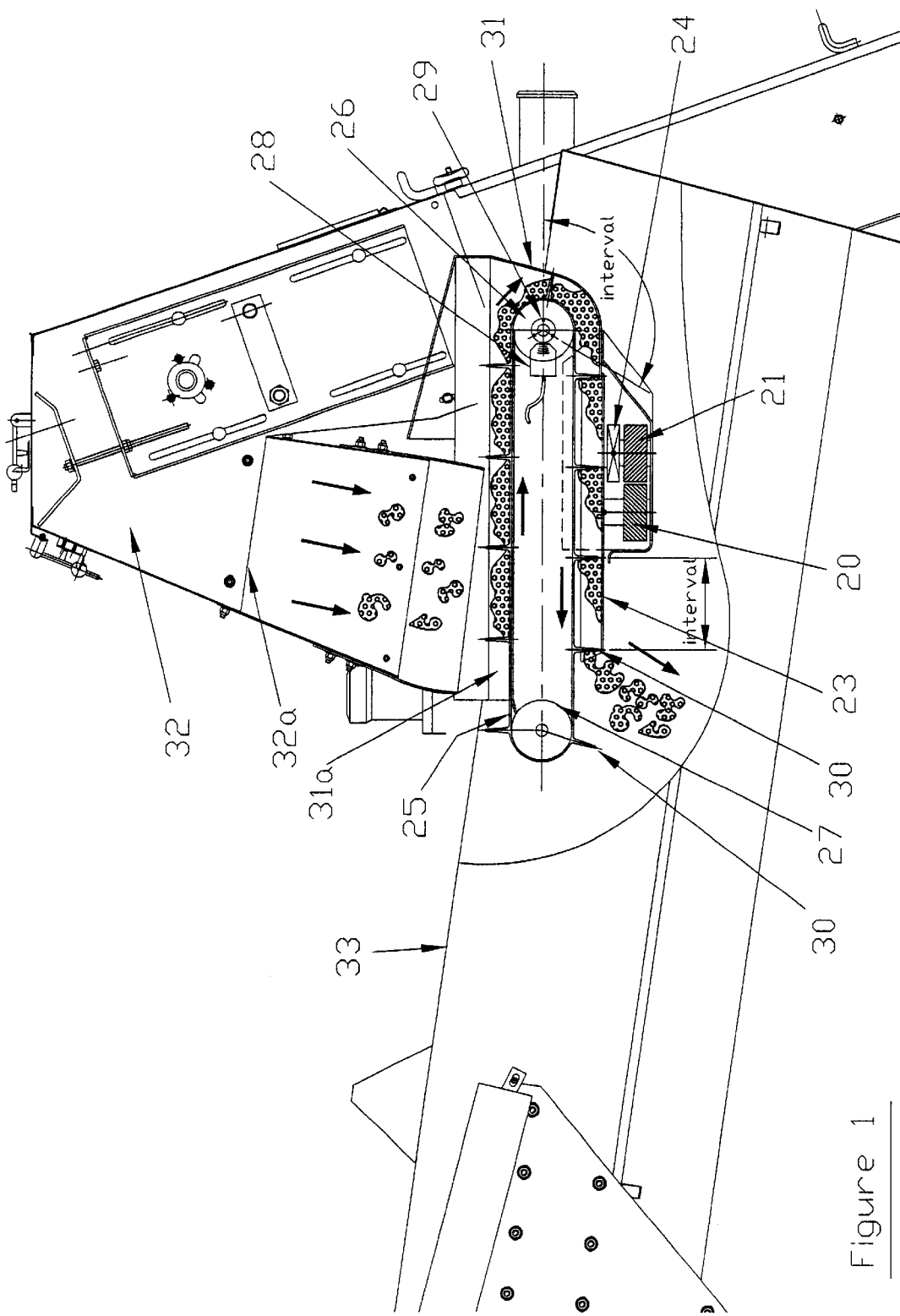
FIG. 1 is a front elevation of the on-board weighing system according to the invention installed below the discharge opening of a elevator conveyor enabling routing of the harvested grapes to one of the receiving tubs for the harvest in the harvesting machine.
Figure 2:
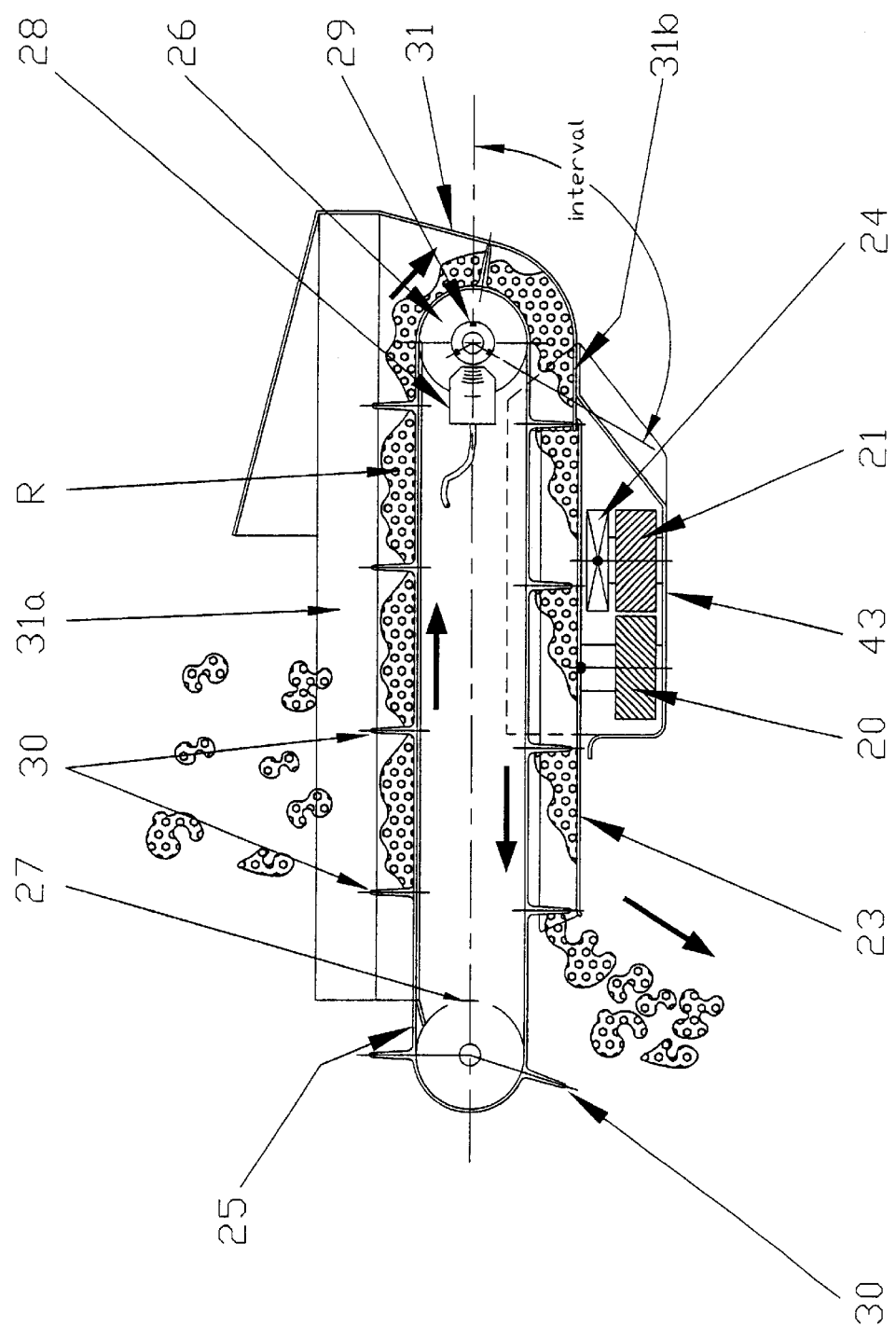
FIG. 2 is an enlarged front elevation of the weighing system depicted alone.
Figure 3:
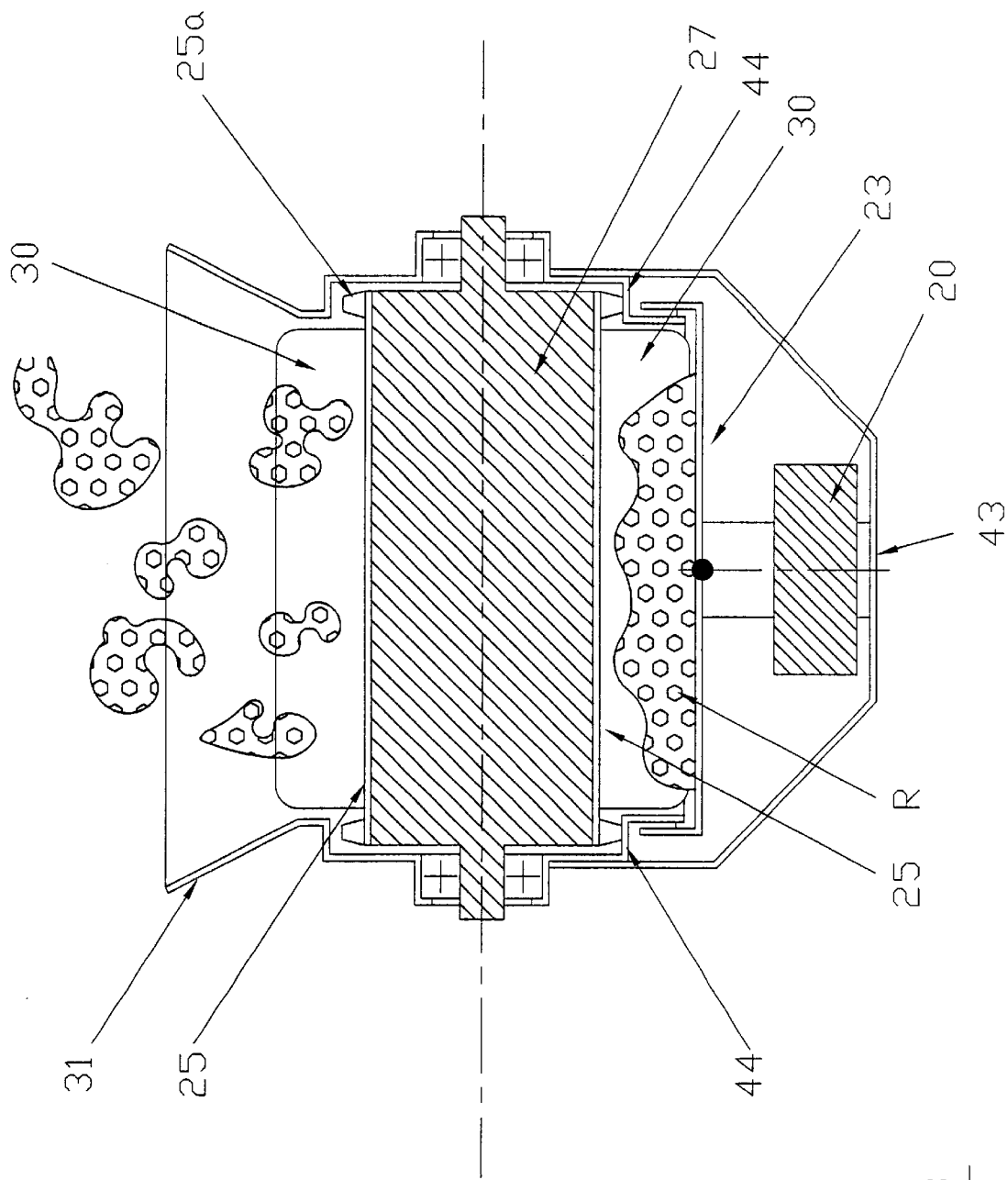
FIG. 3 is a detail illustrating the guidance of the conveyor belt providing for the passage of the harvested material over the weighing platform.
Figure 4:
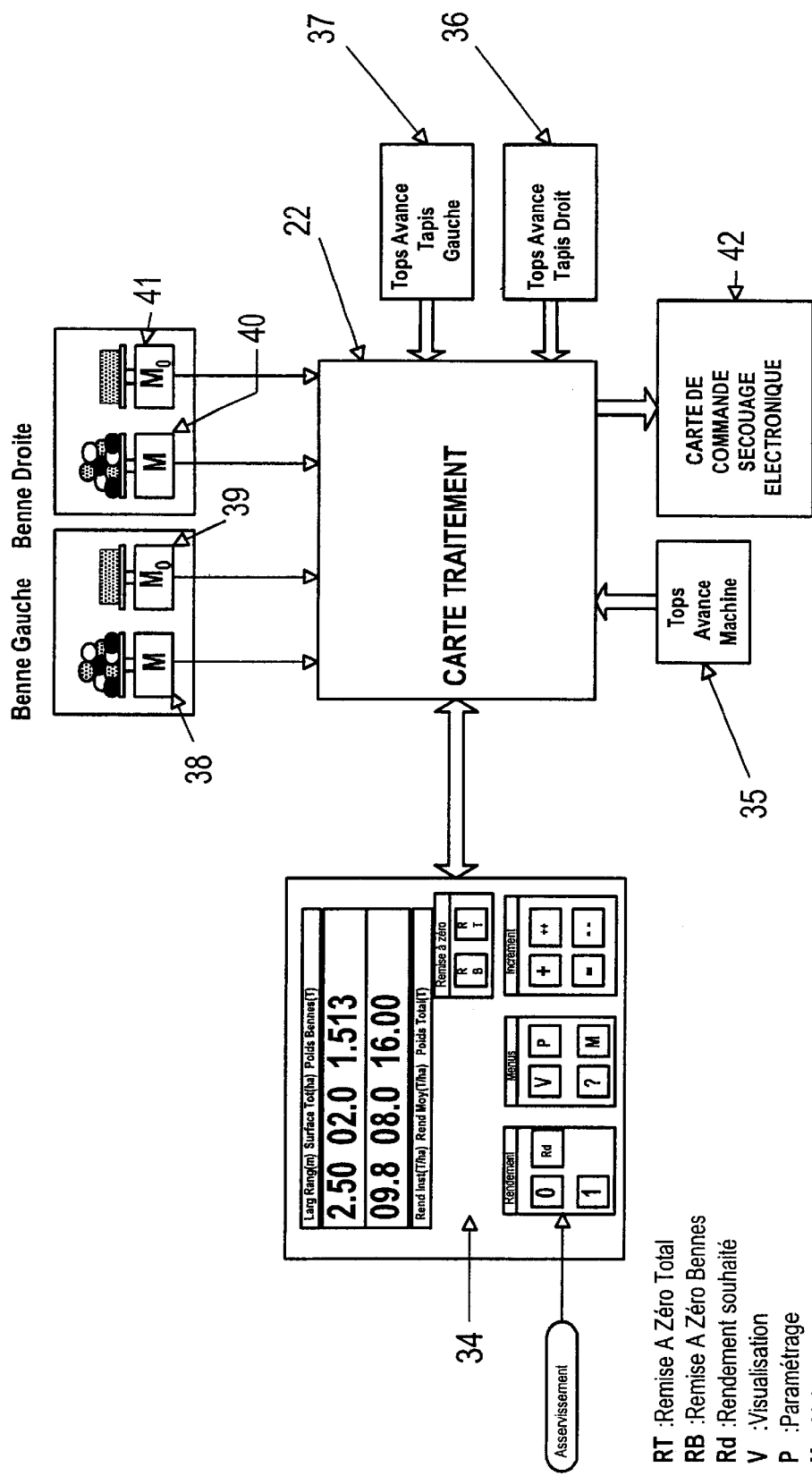
FIG. 4 is a summary view of the continuous harvest weighing system according to the invention.

An interesting exemplary embodiment, although absolutely nonrestrictive, of the device and implementation of the selective grape harvesting process according to the invention, applicable to a grape harvesting machine is described with reference to the drawings.

However, it is again emphasized that the weighing process and device according to invention apply to the weighing, continuously and/or in successive lots, of harvests of varied agricultural products and to machines suited to the harvest of these products in application of this process and of this device.

Considering the fact that grape harvesting machines usually have two grape receiving conveyors disposed one on each side of their vertical median plane (i.e., to the left and to the right of the plane relative to the direction of travel of these machines) and routing the grapes to one or two tubs disposed in the upper part of the machine, machines making use of the invention will be equipped with two identical weighing devices installed on the path of the harvested material. Preferably, these devices are placed below the discharge openings of the elevators opening into the tubs. They are, for example, fixed by elastic connection means on the housings of said elevators.

Each weighing device includes two, preferably identical, electronic balances 20 and 21, for example, of the strain gauge or capacitive type, connected to an electronic computer unit 22, with these two balances being fixedly mounted on the same support 43.

One of these balances (balance 20) supports a weighing platform 23 installed in the path of the harvested material R, with this weighing platform remaining immobile in its mounting position. The second balance (balance 21) is a control balance. It supports a known fixed reference mass ($M_o$) 24. This mass corresponds to the weight of the platform 23 plus a mass corresponding to the mean mass that the system can harvest. For example, the weight of the reference mass unit may be 400 g (weight of the platform 23)+250 g of mass representing one-half of the maximum capacity of the weighing system.

A feed system of the harvested material independent of the weighing platform 23 of the weighing balance 20 enables passing the harvested grapes, continuously and/or in successive lots, over the weighing platform. This system includes an endless conveyor belt 25 winding around two drums 26 and 27. Measurement mechanism connected to the electronic computer 22 enable measurement of the travel rate of this conveyor belt.

For example, according to the embodiment illustrated, the drive drum 26 is driven by a hydraulic motor or another type of motor. The rotational speed of this drive drum is measured by a sensor 28, for example, by a Hall-effect sensor, which detects the passage of permanent magnets 29 mounted on the drum, with this sensor linked to the electronic computer unit 22. The magnets 29 are regularly spaced around the drum.

The conveyor belt 25 is equipped, on its external surface, with transverse oriented strips 30. These strips enable:
  entraining the harvested material discharged on the carrying run of the conveyor belt;
  dividing the harvested material into "doses" which are held between the strips, regardless of the tilt of the harvesting machine.
  routing the harvested material to the weighing platform 23 of the weighing balance 20 and passing it, continuously and/or in successive lots, over the weighing platform.

The angular interval between two magnets 29 is a function of the interval between two consecutive strips 30, such that the angular movement between two magnets corresponds exactly to the movement of two consecutive strips of the conveyor belt.

The conveyor belt 25 is installed in a housing 31 whose side walls 31a enable containment of the harvested grapes on the sides of the conveyor belt 25. The conveyor belt 25 may be provided on the sides with lateral flanges 25a in enabling retention of the juice on its carrying run.

The bottom 31b of this housing has an opening in which the weighing platform 23 of the weighing balance 20 is disposed. The edge of this opening, for example, made up of a flat portion of the bottom 31b, and the weighing platform 23 are disposed in the same plane, such that the harvested grapes may pass, without vibration, from the bottom of the housing onto the weighing platform.

Rails 44, constructed in one piece with the lateral walls 31a of the housing 31 and disposed on both sides of the bottom run of the conveyor belt, enable guidance of the bottom run, such that the strips 30 of the conveyor belt may not, in any case, touch the weighing platform 23.

As previously indicated, the two weighing units including the above characteristics may be fixed, by utilizing elastic connections, on the elevator conveyors 32 of grape harvesting machines, below the discharge opening 32a thereof and above the collection tubs 33.

The electronic computer unit 22 may advantageously be made up of an electronic microprocessor board. In this case, this board has digital and analog inputs and outputs, i.e.:
  Digital inputs: control pad 34, machine forward movement speed sensor 35, right belt advance beep 36, left belt advance beep 37;
  Analog inputs: control pad 34, left balance platform signal 38, left platform reference mass signal 39, right balance platform signal 40, right platform reference mass signal 41;
  Analog outputs: control pad 34, electronic shaking control board 42.

Figure 5:
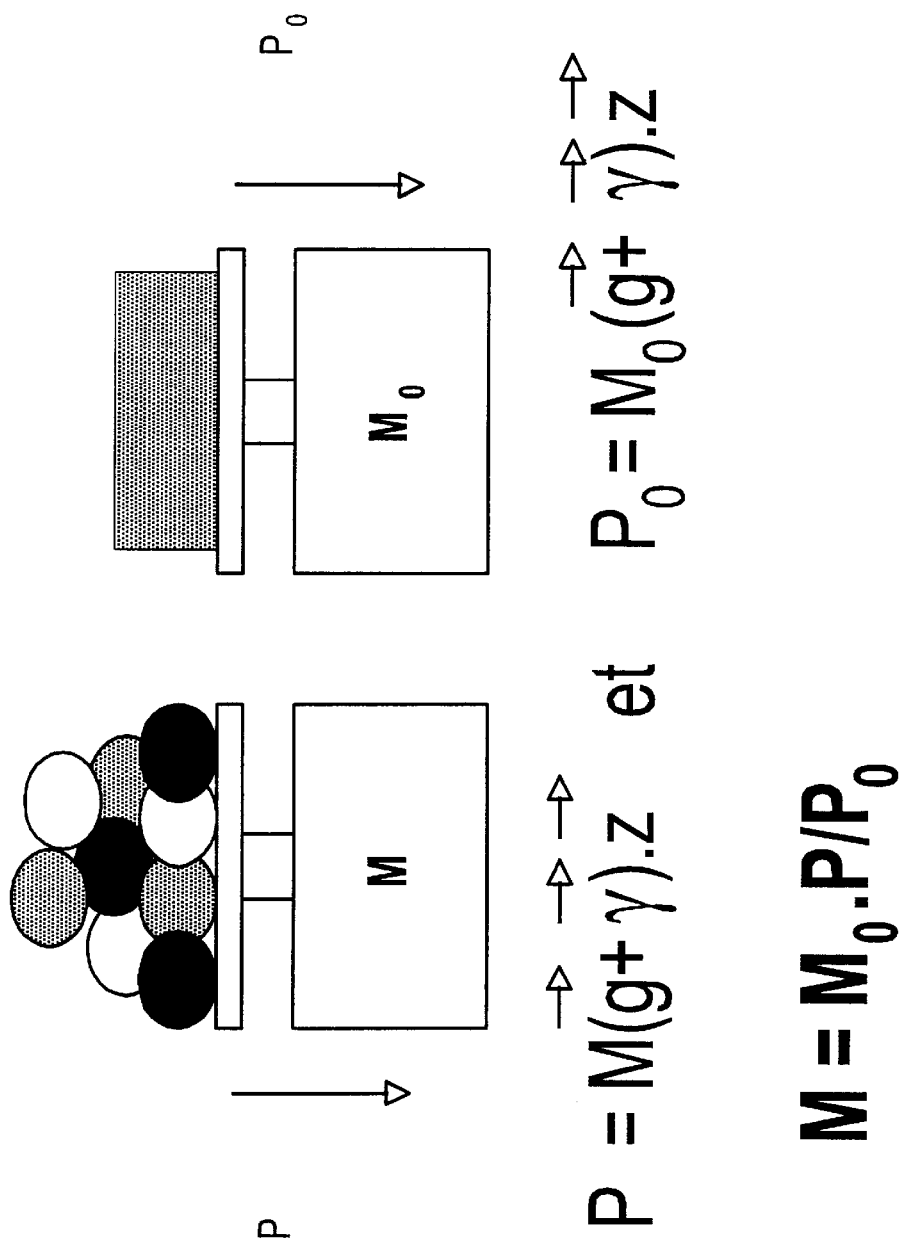
FIG. 5 is a representation of the algorithm enabling continuous elimination of the causes of interference with the measurements due to the noises and the tilting of the harvest machine.
Figure 1:
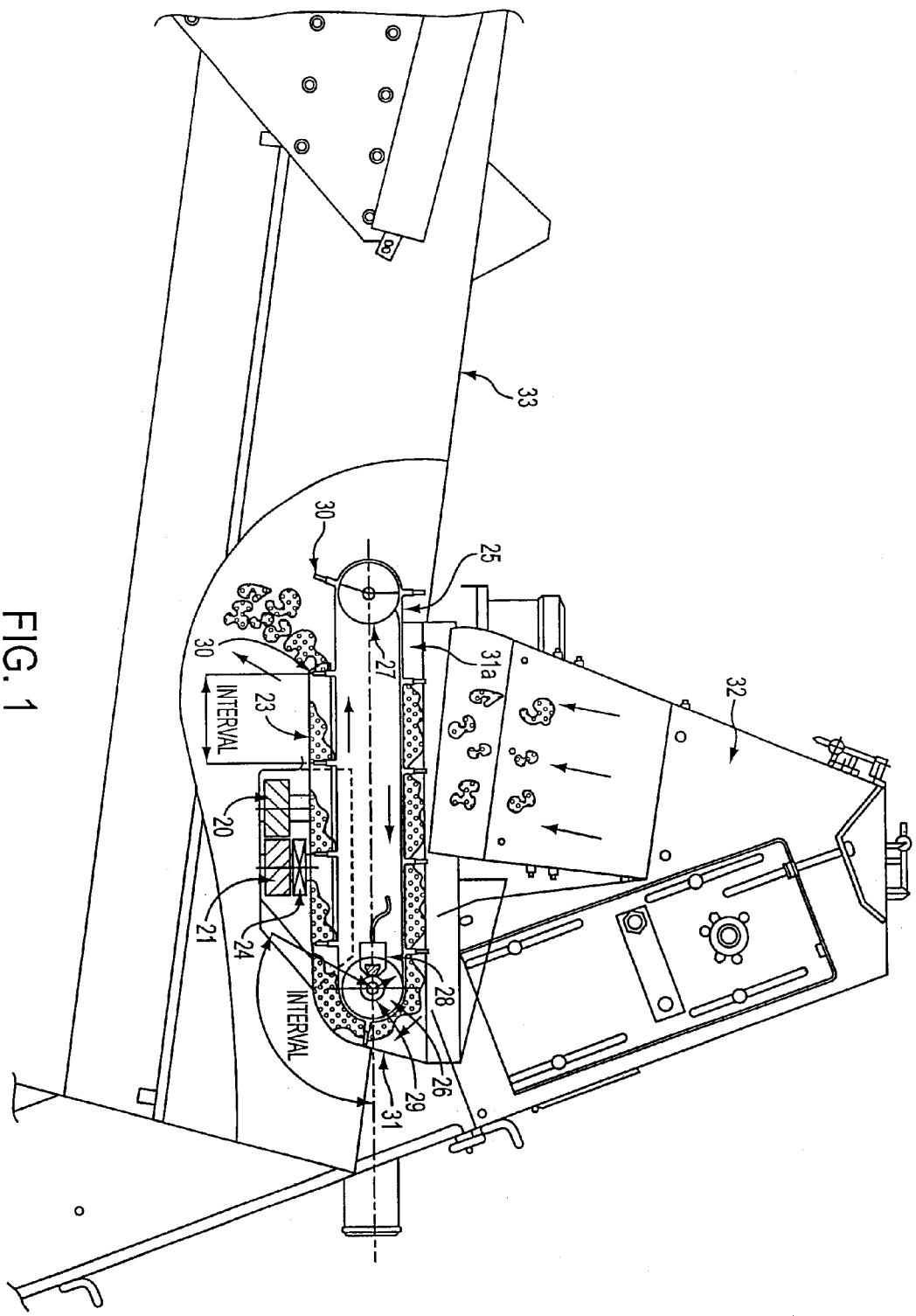
Figure 2:
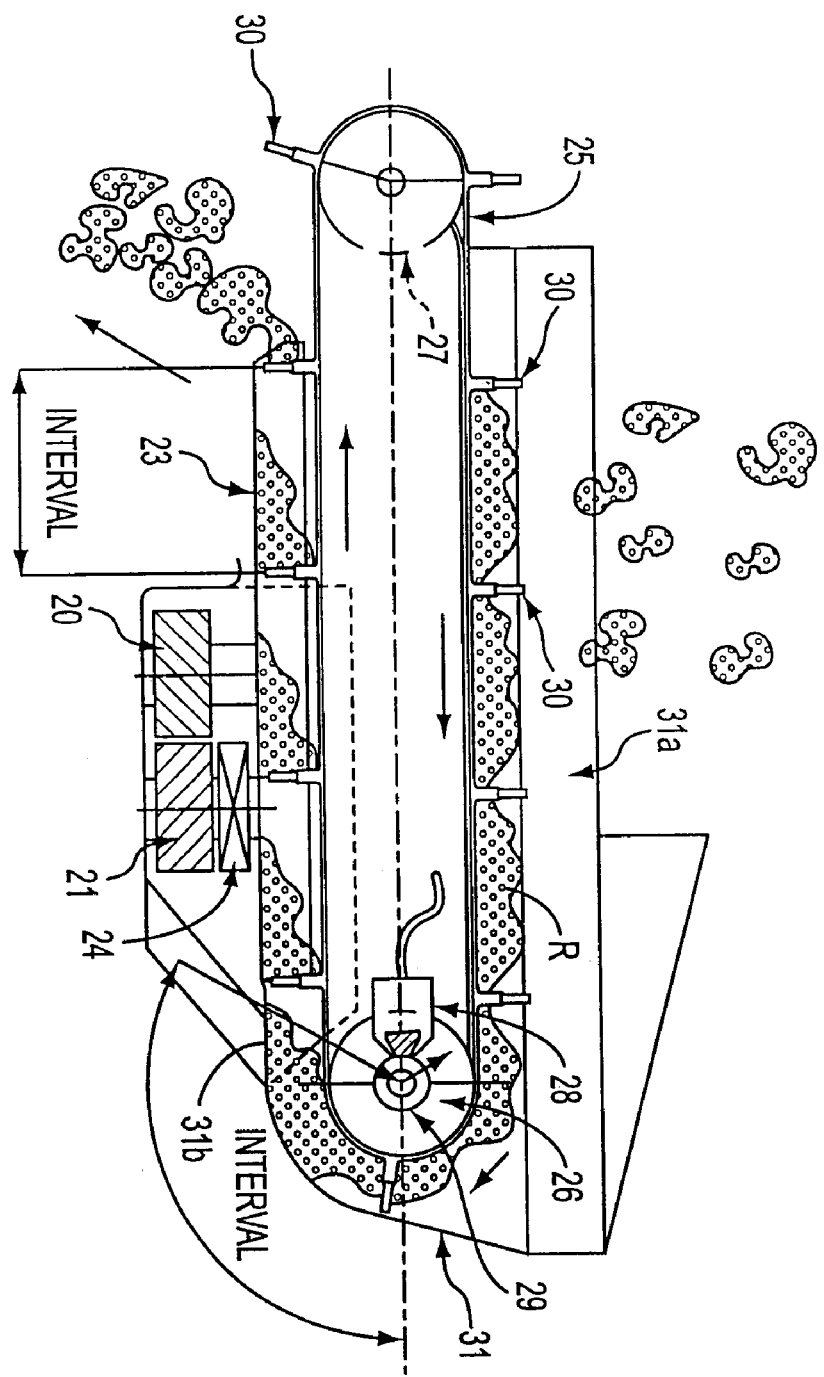
Figure 4:
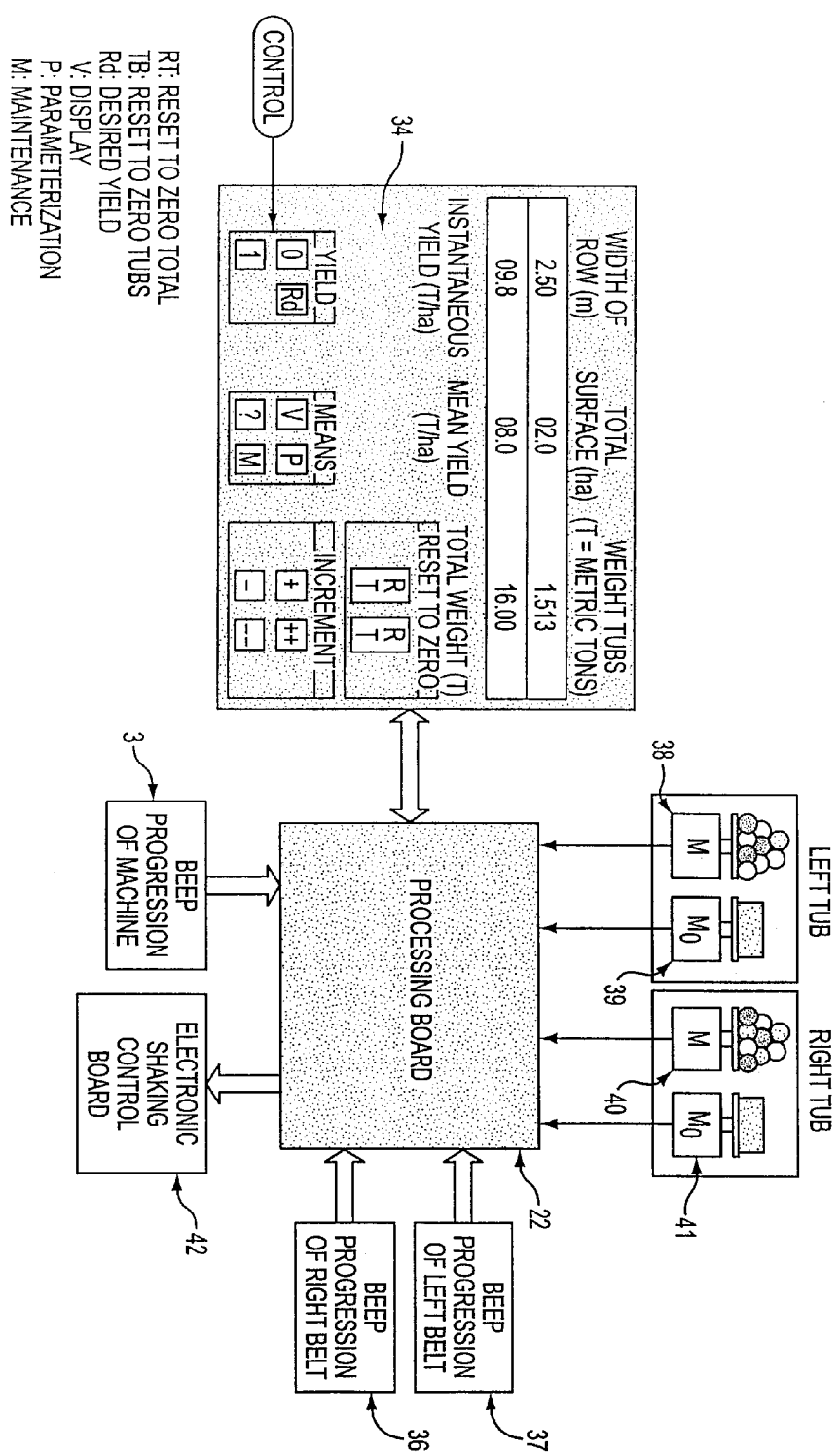
Figure 5:
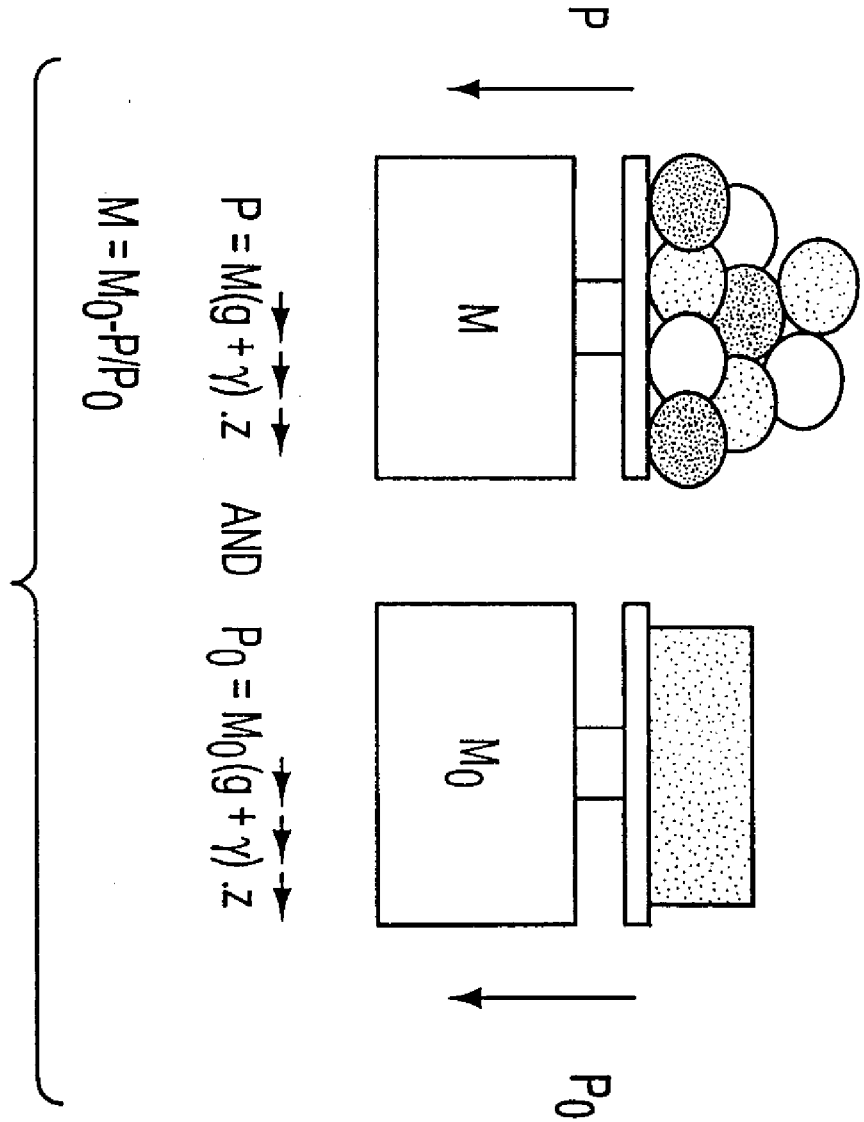

According to the process of the invention, the known reference mass $M_o$ 24 control balance 21 enables, by application of the algorithm according to FIG. 5, continuous adjustment of the measurements transmitted by the weighing balances, continuously eliminating the causes of interference to these measurements comprising the more or less violent vibrations to which the machine is subjected and the tilts of the machine when it is in operation (it should be recalled that the planted fields are more or less irregular, more or less rutted, and more less saturated with water).

According to another characteristic of the process of the invention, partially redundant weighings are performed (i.e., a new weighing is performed before the harvested material already weighed has completely left the platform); these redundant weighings enable improvement of the precision of the calculation of the weight rate, whether for the instantaneous value or for the mean value.

For example, the "weighed beeps" are issued by the sensor 28 of the drive drum 26 and correspond to successive passage of two strips 30. During this time, successive sequences of multiple weighings are performed and the electronic computer 22 establishes the mean of these weighing for each sequence.

For example, 3 weighings are performed successively: for example, 1 every 50 milliseconds. The mean of 3 weighings makes it possible to obtain precision on the order of 3%.

Tests have shown that the per-hectare capacity of the weighing device can be on the order 30 metric tons/ha, with the aforementioned precision.

It is observed that for the single application of continuous weighing, the control pad 34 enables keying in the width of the plantings. It also permits reset to zero:
  of the weighing at the beginning of the parcel;
  of the weighing of the tubs at the time of each emptying. The results displayed on the control pad 34 are:
  the total surface covered by the machine since fill reset to zero: this is the distance traveled by the machine (shaking operating) multiplied by the width of the plantings.
  the total weight of the two tubs since the last emptying: this indication enables the driver to note the time of emptying of the tubs.
  the total weight of the grapes harvested since the beginning of the parcel.
  the total mean yield: this is the total weight divided by the area harvested.
  the instantaneous yield realized over a distance of one meter, with a 2-second delay.

The invention also concerns harvesting machines for varied agricultural products, for example, occurring in the form of grains, seeds, drupes, berries, or others, involving application of the characteristics of the device and of the process above.

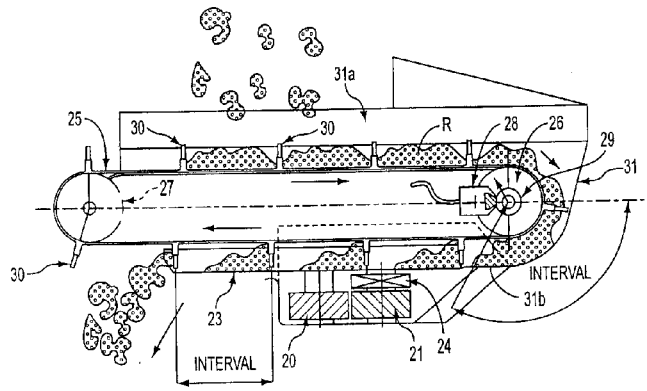

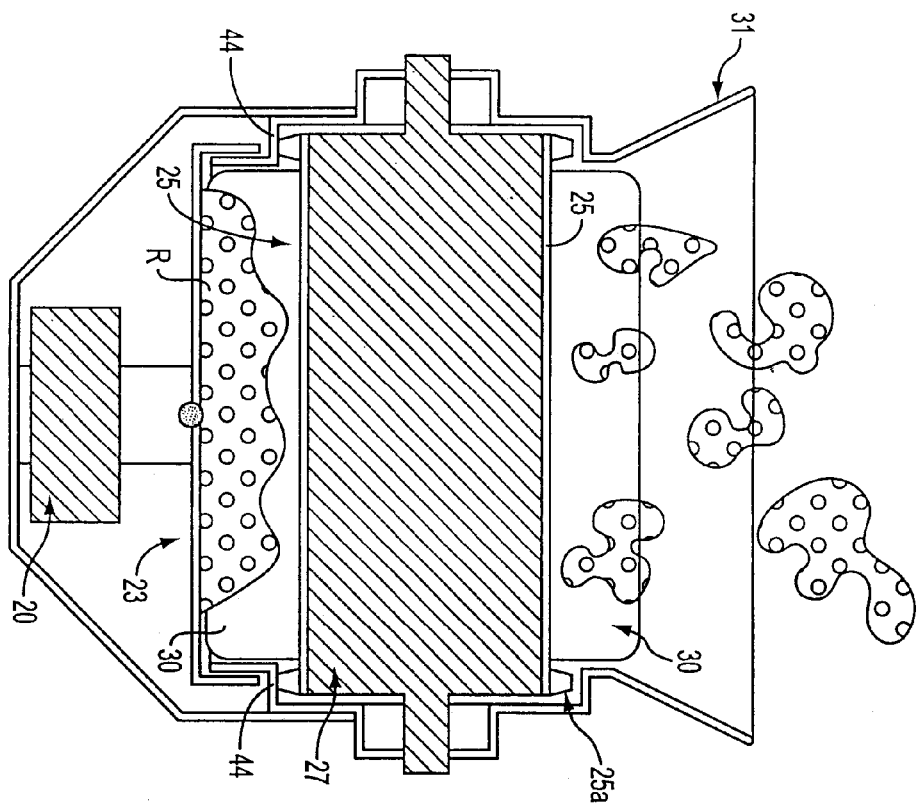

What is claimed is:

1. A method of on-board weighing of harvested materials on a harvesting machine having a path for the harvested material wherein the harvesting machine includes first and second weighing devices disposed near each other on a common support and being connected to an electronic computer, the first and second weighing devices being one of electronic balance or scale, the second weighing device being equipped with a weighing platform which is installed in the path of the harvested material, the harvesting machine further including a feed system which is independent of the weighing platform, and is weighed independently thereof, the method comprising:

supporting a known fixed mass on the first weighing device;

successively weighing the known fixed mass on the first weighing device;

feeding, with the feed system, one lot at a time, the harvested material onto the weighing platform of the second weighing device;

weighing only the harvested material on the second weighing device;

removing completely the weighed lot of harvested material from the second weighing device; and processing signals from the first and second weighing devices using the computer, wherein the computer performs algorithmic processing of the signals to eliminate a dynamic interference effect which results from one of slopes, tilts, or vibrations of the harvesting machine.

2. The method of claim 1, wherein the first and second weighing devices are identical.

3. The method of claim 1, wherein the first and second weighing devices are of the strain gauge or capacitive type.

4. The method of claim 1, further comprising simultaneously weighing the fixed mass and the harvested material.

5. The method of claim 1, wherein the feeding comprises automatically routing the harvested material.

6. The method of claim 1, wherein the computer utilizes an algorithm which includes a mass, a gravity acceleration directed downward, an acceleration representing a dynamic interference, and a unit vector.

7. The method of claim 1, wherein the feeding comprises feeding the harvested material over the weighing platform using a conveyor belt which moves at a travel speed and wherein the computer takes into account the travel speed in the algorithmic processing to calculate a weight rate.

8. The device of claim 1, wherein the harvesting materials comprise an agricultural product which is one of grains, seeds, drupes, berries and grapes.

9. A method of on-board weighing of harvested materials on a harvesting machine having a path for the harvested material wherein the harvesting machine includes first and second weighing devices disposed near each other on a common support and being connected to an electronic computer, the first and second weighing devices being one of electronic balance or scale, the second weighing device being equipped with a weighing platform which is installed in the path of the harvested material, the harvesting machine further including a feed system which is independent of the weighing platform, the method comprising:

supporting a known fixed mass on the first weighing device;

successively weighing the known fixed mass on the first weighing device;

feeding, with the feed system, the harvested material continuously and in successive lots onto the weighing platform of the second weighing device;

weighing the harvested material on the second weighing device;

processing signals from the first and second weighing devices using the computer, wherein the computer performs algorithmic processing of the signals to eliminate a dynamic interference effect which results from one of slopes, tilts and vibrations of the harvesting machine; and measuring a forward speed of the harvesting machine using a measuring device installed on the harvesting machine, wherein the computer takes into account the speed in the algorithmic processing to calculate a per-hectare yield.

10. An on-board weighing device for a harvesting machine having a path for the harvested material comprising:

first and second weighing devices disposed near each other on a common support and being connected to an electronic computer, the first and second weighing devices being one of electronic balance or scale;

the first weighing device being a control weighing device which supports a known fixed reference mass, for successively weighing the known fixed reference mass;

the second weighing device being equipped with a weighing platform which is installed in the path of the harvested material for weighing only the harvested material;

a feed system which is independent of the weighing platform, the feed system feeding the harvested material continuously and in successive lots onto the weighing platform of the second weighing device; and a computer for processing signals from the first and second weighing devices, wherein the computer performs algorithmic processing of the signals to eliminate a dynamic interference effect which results from one of slopes, tilts, or vibrations of the harvesting machine.

11. The device of claim 10, wherein the first and second weighing devices are identical.

12. The device of claim 10, wherein the first and second weighing devices are of the strain gauge or capacitive type.

13. The device of claim 10, wherein the first and second weighing devices simultaneously weigh the fixed mass and the harvested material.

14. The device of claim 10, wherein the feed system automatically routs the harvested material.

15. The device of claim 10, wherein the computer utilizes an algorithm which includes a mass, a gravity acceleration directed downward, an acceleration representing a dynamic interference, and a unit vector.

16. The device of claim 10, wherein the feed system includes a conveyor belt for feeding the harvested material over the weighing platform, the conveyor belt moving at a travel speed and wherein the computer takes into account the travel speed in the algorithmic processing to calculate a weight rate.

17. The device of claim 10, wherein the fixed mass has a weight which corresponds to a weight of the weighing platform plus a weight of a mean mass of harvested material.

18. The device of claim 10, further comprising a measuring device installed on the harvesting machine for measuring a forward speed, wherein the measurement device is linked to the computer.

19. The device of claim 10, wherein the harvesting materials comprise an agricultural product which is one of grains, seeds, drupes, berries and grapes.

20. The device of claim 10, wherein the second weighing device is installed in the harvesting machine via elastic connections.

21. An on-board weighing device for a harvesting machine having a path for the harvested material comprising:

first and second weighing devices disposed near each other on a common support and being connected to an electronic computer, the first and second weighing devices being one of electronic balance or scale;

the first weighing device being a control weighing device which supports a known fixed reference mass, the control weighing device being adapted to successively weigh the known fixed reference mass;

the second weighing device being equipped with a weighing platform which is installed in the path of the harvested material, the second weighing device being adapted to weigh the harvested material;

a feed system which is independent of the weighing platform, the feed system being adapted to feed the harvested material continuously and in successive lots onto the weighing platform of the second weighing device;

a computer for processing signals from the first and second weighing devices, wherein the computer performs algorithmic processing of the signals to eliminate a dynamic interference effect which results from one of slopes, tilts, or vibrations of the harvesting machine; and a measuring device installed on the harvesting machine for measuring a forward speed, wherein the computer takes into account the speed in the algorithmic processing to calculate a per-hectare yield.

22. An on-board weighing device for a harvesting machine having a path for the harvested material comprising:

first and second weighing devices disposed near each other on a common support and being connected to an electronic computer, the first and second weighing devices being one of electronic balance or scale;

the first weighing device being a control weighing device which supports a known fixed reference mass, the control weighing device being adapted to successively weigh the known fixed reference mass;

the second weighing device being equipped with a weighing platform which is installed in the path of the harvested material, the second weighing device being adapted to weigh the harvested material;

a feed system which is independent of the weighing platform, the feed system being adapted to feed the harvested material continuously and in successive lots onto the weighing platform of the second weighing device;

a computer for processing signals from the first and second weighing devices, wherein the computer performs algorithmic processing of the signals to eliminate a dynamic interference effect which results from one of slopes, tilts and vibrations of the harvesting machine;

the feed system including a continuous conveyor which winds around two drums, the continuous conveyor having transverse strips on an external surface and being installed in a housing; and a plurality of regularly spaced permanent magnets disposed on one of the two drums, and a sensor positioned adjacent the permanent magnets linked to the computer, wherein the regularly spaced permanent magnets are spaced apart by a distance which corresponds to a function of a distance between the transverse strips.

* * * * *

UNITED STATES PATENT AND TRADEMARK OFFICE
CERTIFICATE OF CORRECTION

PATENT NO. : 6,283,853 B1
DATED : September 4, 2001
INVENTOR(S) : R. Pellenc et al.

It is certified that error appears in the above-identified patent and that said Letters Patent is hereby corrected as shown below:

Title page, showing the illustrative figure, should be deleted and replaced by the attached title page.

Drawings,
Sheets 1 through 5 and Figures 1 through 5 are incorrect and should be replaced with the new drawing sheets attached herto.

Signed and Sealed this

Ninth Day of September, 2003

JAMES E. ROGAN
*Director of the United States Patent and Trademark Office*

(12) United States Patent
Pellenc et al.

(10) Patent No.: US 6,283,853 B1
(45) Date of Patent: Sep. 4, 2001

(54) ON-BOARD DEVICE AND METHOD FOR CONTINUOUS WEIGHING OF HARVEST AND HARVESTING MACHINES USING SAME

(75) Inventors: Roger Pellenc, Pertuis; Antoine Bourely, La Tour d'Aigues, both of (FR)

(73) Assignee: Pellenc S.A., Pertuis (FR)

(*) Notice: Subject to any disclaimer, the term of this patent is extended or adjusted under 35 U.S.C. 154(b) by 0 days.

(21) Appl. No.: 09/297,057

(22) PCT Filed: Sep. 4, 1998

(86) PCT No.: PCT/FR98/01900

§ 371 Date: Apr. 29, 1999

§ 102(e) Date: Apr. 29, 1999

(87) PCT Pub. No.: WO99/13301

PCT Pub. Date: Mar. 18, 1999

(30) Foreign Application Priority Data

Sep. 5, 1997 (FR) .................................................. 97 11265

(51) Int. Cl.⁷ ............................ A01D 75/18; A01F 12/16
(52) U.S. Cl. .................................................. 460/6; 460/114
(58) Field of Search ............................ 460/6, 114, 119, 460/149, 4, 7, 116, 150; 56/10.2 R, 102 H, DIG. 15

(56) References Cited

U.S. PATENT DOCUMENTS

| 5,050,693 |   | 9/1991  | Wirth et al. ...................... 177/200 |
| 5,318,475 | * | 6/1994  | Schrock et al. .................... 460/1 |
| 5,487,702 | * | 1/1996  | Campbell et al. .................. 460/7 |
| 5,685,772 | * | 11/1997 | Andersen et al. .................. 460/6 |
| 5,750,877 | * | 5/1998  | Behnke et al. ..................... 73/1.33 |
| 5,863,247 | * | 1/1999  | Behnke et al. ..................... 460/6 |
| 5,890,961 | * | 4/1999  | Behnke et al. ..................... 460/6 |

FOREIGN PATENT DOCUMENTS

| 4239201    | 5/1994 | (DE) . |
| 195 44 057 | 5/1997 | (DE) . |
| 0656530    | 6/1995 | (EP) . |
| 2601771    | 1/1988 | (FR) . |
| 2709230    | 3/1995 | (FR) . |
| 89/03023   | 4/1989 | (WO) . |

\* cited by examiner

*Primary Examiner*—Thomas B. Will
*Assistant Examiner*—Árpád Fábián Kovács
(74) *Attorney, Agent, or Firm*—Greenblum & Bernstein, P.L.C.

(57) ABSTRACT

Device and method of on-board weighing of harvested materials on a harvesting machine having a path for the harvested material. The device includes first and second weighing devices disposed near each other on a common support and being connected to an electronic computer. The first and second weighing devices are one of an electronic balance or scale. The second weighing device is equipped with a weighing platform which is installed in the path of the harvested material. A feed system is included which is independent of the weighing platform. The method includes supporting a known fixed mass on the first weighing device, successively weighing the known fixed mass on the first weighing device, feeding, with the feeding system, the harvested material continuously and in successive lots onto the weighing platform of the second weighing device, weighing the harvested material on the second weighing device, and processing signals from the first and second weighing devices using the computer. The computer performs algorithmic processing of the signals to eliminate a dynamic interference effect which results from one of slopes, tilts and vibrations of the harvesting machine.

22 Claims, 5 Drawing Sheets